(12) United States Patent
Liu et al.

(10) Patent No.: US 11,698,699 B2
(45) Date of Patent: *Jul. 11, 2023

(54) VIRTUAL KEYBOARD ERROR CORRECTION BASED ON A DYNAMIC SPATIAL MODEL

(71) Applicant: Google LLC, Mountain View, CA (US)

(72) Inventors: Xu Liu, San Jose, CA (US); Shumin Zhai, Los Altos, CA (US); Adrian Pittman, San Francisco, CA (US); Billy Dou, Beijing (CN)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,937

(22) Filed: May 3, 2022

(65) Prior Publication Data

US 2022/0261135 A1 Aug. 18, 2022

Related U.S. Application Data

(63) Continuation of application No. 17/079,492, filed on Oct. 25, 2020, now Pat. No. 11,347,352.

(51) Int. Cl.
*G06F 3/048* (2013.01)
*G06F 3/041* (2006.01)
*G06F 3/04886* (2022.01)

(52) U.S. Cl.
CPC ...... *G06F 3/04186* (2019.05); *G06F 3/04886* (2013.01)

(58) Field of Classification Search
None
See application file for complete search history.

(56) References Cited

U.S. PATENT DOCUMENTS

| 5,748,512 A | 5/1998 | Vargas |
| 2012/0154298 A1 | 6/2012 | Wu et al. |

(Continued)

FOREIGN PATENT DOCUMENTS

| JP | 2000-066817 | 3/2000 |
| JP | 2004-341813 | 12/2004 |

(Continued)

OTHER PUBLICATIONS

Clover, "SwiftKey for iOS Updated With Tap Map Feature, Usage Statistics", Retrieved from Internet: https://www.macrumors.com/2015/04/02/swiftkey-updated-with-tap-map/, Apr. 2, 2015, 8 pages.

(Continued)

*Primary Examiner* — William C Trapanese
(74) *Attorney, Agent, or Firm* — IP Spring

(57) ABSTRACT

A method includes detecting a touch input by a user at a position on a virtual keyboard. The method further includes applying a spatial model to map the touch input to one or more first candidate keys of the virtual keyboard, wherein the spatial model maps the touch input to the one or more first candidate keys based on a heatmap of prior touch inputs by the user. The method further includes applying a language model to map the touch input to one or more second candidate keys of the virtual keyboard, wherein the language model maps the touch input to the one or more second candidate keys based on comparing the position of the touch input to one or more predicted next keys. The method further includes selecting a particular key of the one or more first and second candidate keys as indicated by the touch input.

20 Claims, 10 Drawing Sheets
(1 of 10 Drawing Sheet(s) Filed in Color)

(56) References Cited

U.S. PATENT DOCUMENTS

| | | | | |
|---|---|---|---|---|
| 2013/0067382 | A1* | 3/2013 | Townsend | G06F 3/04886 715/773 |
| 2014/0380224 | A1* | 12/2014 | Zhang | G06F 3/0418 715/773 |
| 2017/0052702 | A1* | 2/2017 | Norris, III | G06F 40/274 |
| 2017/0090749 | A1* | 3/2017 | Marsden | G06F 3/04886 |
| 2019/0294768 | A1* | 9/2019 | McMurdie | H04L 67/306 |
| 2020/0081974 | A1 | 3/2020 | Zhai et al. | |

FOREIGN PATENT DOCUMENTS

| | | |
|---|---|---|
| JP | 2008-539476 | 11/2008 |
| JP | 2009-003704 | 1/2009 |
| JP | 2009-245031 | 10/2009 |
| JP | 2009-252076 | 10/2009 |
| JP | 2011-150489 | 8/2011 |
| JP | 2012-248153 | 12/2012 |
| JP | 2014-010688 | 1/2014 |
| JP | 2014-517602 | 7/2014 |
| JP | 2014-192687 | 10/2014 |
| WO | 2010/035574 | 4/2010 |

OTHER PUBLICATIONS

EPO, Extended European Search Report for European Patent Application No. 21194818.7, dated Nov. 25, 2021, 9 pages.
USPTO, Final Office Action for U.S. Appl. No. 17/079,492, dated Dec. 15, 2021, 13 pages.
USPTO, First Action Interview, Pre-Interview Communication for U.S. Appl. No. 17/079,492, dated Feb. 19, 2021, 4 pages.
USPTO, Notice of Allowance for U.S. Appl. No. 17/079,492, dated Feb. 28, 2022, 7 pages.
USPTO, First Action Interview, Office Action Summary for U.S. Appl. No. 17/079,492, dated Jul. 1, 2021, 13 pages.
WIPO, International Search Report for International Patent Application No. PCT/US2020/064545, dated Jul. 9, 2021, 4 pages.
WIPO, Written Opinion for International Patent Application No. PCT/US2020/064545, dated Jul. 9, 2021, 7 pages.
Hagiya, et al., 74th (Heisei 24(2012)) National Conference Lecture Collected-Papers (4) Interface Computer and Human Society, Japan, General Incorporated Foundation Information Processing Society of Japan, Mar. 6, 2012, pp. 4-13 to 4-14.
JPO, Office Action for Japanese Patent Application No. 2021-560740, dated Jan. 31, 2023, 5 pages.

* cited by examiner

500

525

625

630

VIRTUAL KEYBOARD ERROR CORRECTION BASED ON A DYNAMIC SPATIAL MODEL

CROSS-REFERENCE TO RELATED APPLICATIONS

This application is a continuation of U.S. patent application Ser. No. 17/079,492, filed Oct. 25, 2020 and titled VIRTUAL KEYBOARD ERROR CORRECTION BASED ON DYNAMIC SPATIAL MODEL, which is incorporated herein by reference in its entirety.

BACKGROUND

With the prevalence of mobile devices, the use of virtual keyboards is common. Virtual keyboards, however, can be frustrating to use due to a difference between the user's expected position on a virtual keyboard and the real tapped position. For example, a recent study on types of typing errors found that 37% of typing errors in English language virtual keyboards were due to spacebar omissions and 60% of typing errors were related to the spacebar, such as confusion between the spacebar and the C, V, B, and N letters in the last row of the virtual keyboard. This may be the result of users having wider fingers, tapping with only one hand, not using sufficiently precise touches, or inherent inaccuracies of touchscreen or gesture-based keystroke entry, etc.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method may comprise detecting a touch input by a user at a position on a virtual keyboard, applying a spatial model to map the touch input to one or more first candidate keys of the virtual keyboard, wherein the spatial model maps the touch input to the one or more first candidate keys based on a heatmap of prior touch inputs, applying a language model to map the touch input to one or more second candidate keys of the virtual keyboard, wherein the language model maps the touch input to the one or more second candidate keys based on comparing the position of the touch input to one or more predicted next keys, and selecting a particular key of the one or more first and second candidate keys as indicated by the touch input.

In some embodiments, the spatial model uses a first Gaussian distribution based on the heatmap of prior touch inputs near a key center to determine a global key center offset and the spatial model maps the touch input based on the global key center offset. In some embodiments, the method further comprises applying a key level center offset to the touch input based on a second Gaussian distribution, wherein the spatial model maps the touch input based on the key level center offset. In some embodiments, the spatial model provides one or more of a global level correction where all keys in a keyboard layout share one parameter, a cluster level correction where all the keys in a same cluster share one parameter, or a key level correction where each key has its own Gaussian parameters. In some embodiments, the method further comprises adjusting a visual appearance of at least a portion of the virtual keyboard based on the heatmap. In some embodiments, adjusting the visual appearance of at least the portion of the virtual keyboard includes adjusting the visual appearance of a spacebar to extend space at least above or below the spacebar. In some embodiments, the method further comprises determining one or more words that include a character that corresponds to the particular key and modifying the one or more words to add or remove a space based on the language model. In some embodiments, the method further comprises updating the heatmap is updated to discard prior touches that are older than a predetermined amount of time. In some embodiments, the method further comprises determining an identify of the user that provides the touch input, wherein the identity is determined based on authentication input provided by the user and retrieving the heatmap that corresponds to the user.

A computing device may comprise a processor and a memory, with instructions stored thereon that, when executed by the processor, cause the processor to perform operations comprising: detecting a touch input by a user at a position on a virtual keyboard, applying a spatial model to map the touch input to one or more first candidate keys of the virtual keyboard, wherein the spatial model maps the touch input to the one or more first candidate keys based on a heatmap of prior touch inputs, applying a language model to map the touch input to one or more second candidate keys of the virtual keyboard, wherein the language model maps the touch input to the one or more second candidate keys based on comparing the position of the touch input to one or more predicted next keys, and selecting a particular key of the one or more first and second candidate keys as indicated by the touch input.

In some embodiments, the spatial model uses a first Gaussian distribution based on the heatmap of prior touch inputs near a key center to determine a global key center offset and the spatial model maps the touch input based on the global key center offset. In some embodiments, the operations further comprise applying a key level center offset to the touch input based on a second Gaussian distribution, wherein the spatial model maps the touch input based on the key level center offset. In some embodiments, the spatial model provides one or more of a global level correction where all keys in a keyboard layout share one parameter, a cluster level correction where all the keys in a same cluster share one parameter, or a key level correction where each key has its own Gaussian parameters. In some embodiments, the operations further comprise adjusting a visual appearance of at least a portion of the virtual keyboard based on the heatmap. In some embodiments, adjusting the visual appearance of at least the portion of the virtual keyboard includes adjusting the visual appearance of a spacebar to extend space at least above or below the spacebar.

A non-transitory computer-readable medium with instructions stored thereon that, when executed by one or more computers, may cause the one or more computers to perform operations, the operations comprising: detecting a touch input by a user at a position on a virtual keyboard, applying a spatial model to map the touch input to one or more first candidate keys of the virtual keyboard, wherein the spatial model maps the touch input to the one or more first candidate keys based on a heatmap of prior touch inputs, applying a language model to map the touch input to one or more second candidate keys of the virtual keyboard, wherein the language model maps the touch input to the one or more second candidate keys based on comparing the position of the touch input to one or more predicted next keys, and selecting a particular key of the one or more first and second candidate keys as indicated by the touch input.

In some embodiments, the spatial model uses a first Gaussian distribution based on the heatmap of prior touch inputs near a key center to determine a global key center offset and the spatial model maps the touch input based on the global key center offset. In some embodiments, the operations further comprise applying a key level center offset to the touch input based on a second Gaussian distribution, wherein the spatial model maps the touch input based on the key level center offset. In some embodiments, the operations further comprise adjusting a visual appearance of at least a portion of the virtual keyboard based on the heatmap. In some embodiments, adjusting the visual appearance of at least the portion of the virtual keyboard includes adjusting the visual appearance of a spacebar to extend space at least above or below the spacebar.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

In some embodiments, a keyboard application detects a touch input by a user at a position on a virtual keyboard. For example, after having entered "mor," the user touches a spot on the virtual keyboard in the vicinity of "b," "n," and the spacebar. The keyboard application applies a dynamic spatial model to map the touch input to one or more first candidate keys of the virtual keyboard. In this example, the spatial model maps the touch input to the one or more first candidate keys (e.g., "b," "n," and the spacebar) based on a heatmap of prior touch inputs by the user. The keyboard application applies a language model to map the touch input to one or more second candidate keys of the virtual keyboard. For example, according to the language model there is a 50% probability that the user is intending to type "n" because that corresponds to "morning," a 20% probability that the user is intending to type "a" because that corresponds to "moral" or "moratorium," a 10% probability that the user is intending to type "b" because that corresponds to "morbid," and a 0% probability that the user is intending to use the spacebar because "mor" is not a proper word. The keyboard application selects a particular key of the one or more first and second candidate keys as indicated by the touch input. For example, if the spatial model indicates a 70% likelihood that the user intended to type "n" based on the touch position and the heatmap, and the language model indicates a 50% likelihood that the user intended to type "n" based on word prediction, then the keyboard application selects "n" based on the combined result.

In some embodiments, the keyboard application modifies a portion of the virtual keyboard based on the heatmap. For example, if the keyboard application determines that the prior inputs and the touch input are above a default key center, the keyboard application may move a display of the portion of the virtual keyboard (e.g., the spacebar) to be higher. In another example, the keyboard application may not move the display but instead interprets a predetermined number of pixels above the spacebar as corresponding to the spacebar.

Example Network Environment 100

Figure 1:
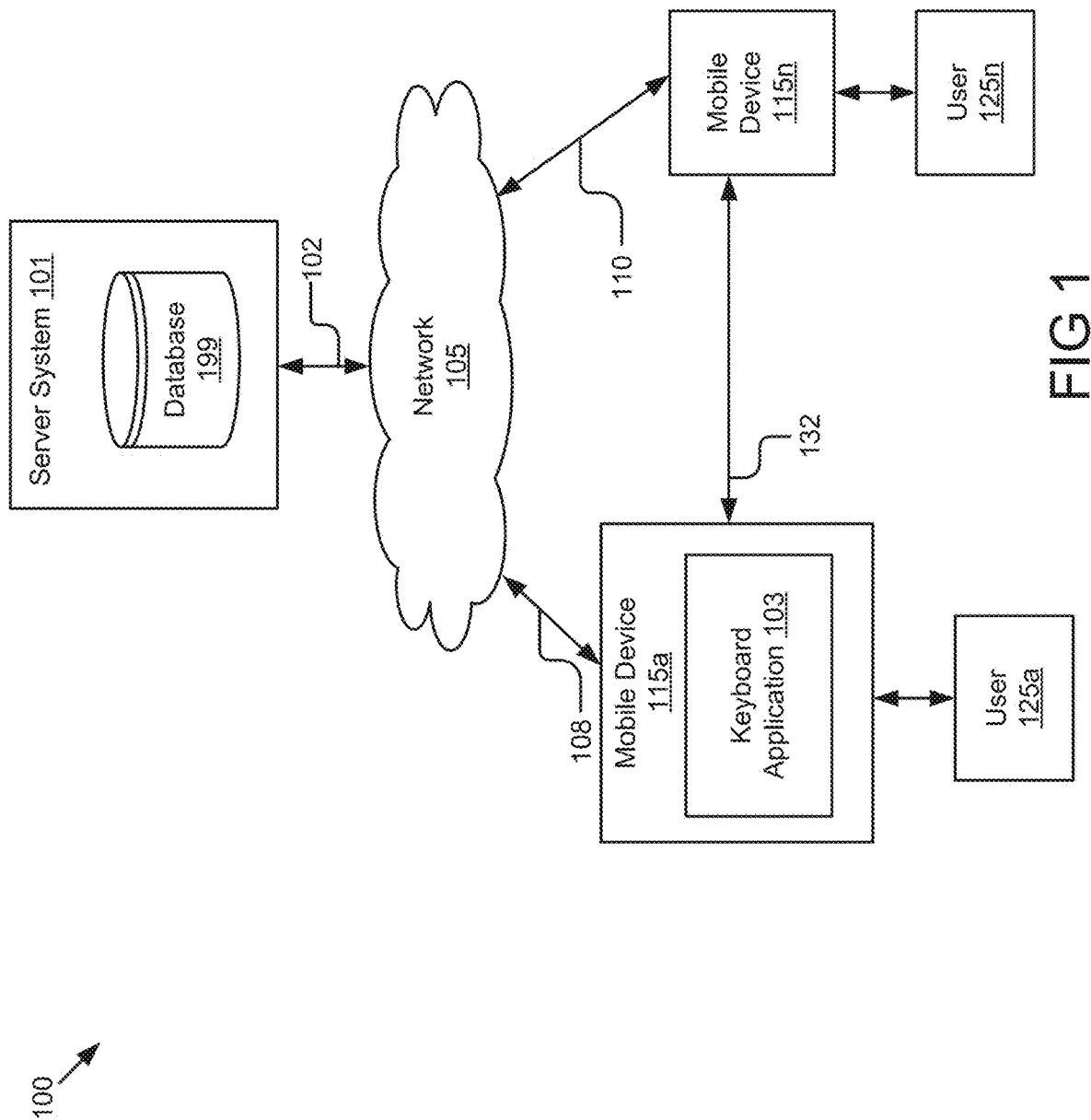
FIG. 1 is a block diagram of an example network environment, according to some embodiments described herein.

FIG. 1 illustrates a block diagram of an example network environment 100. In some embodiments, the network environment 100 can include one or more mobile devices, e.g., mobile devices 115a, 115n. Mobile device 115a can include a keyboard application 103a. The keyboard application 103a may receive touch input from a user and select a particular key for display on a virtual keyboard based on a spatial model and a language model.

The mobile devices 115 can communicate with a network, such as network 105. Network 105 can be any type of communication network, including one or more of the Internet, local area networks (LAN), wireless networks, switch or hub connections, etc. In some embodiments, network 105 can include peer-to-peer communication between devices, e.g., using peer-to-peer wireless protocols (e.g., Bluetooth®, Wi-Fi Direct, Ultrawideband, etc.), etc.

One example of peer-to-peer communications between two mobile devices 115*a* and 115*b* is shown by arrow 132.

The network environment 100 may also include one or more server systems, e.g., server system 101 in the example of FIG. 1. Server system 101 can include a keyboard application 103*b* and a database 199 or other storage device. Database 199 may store information about different users 125 that use the keyboard application 103. In some embodiments, the server system 101 may send updates for the keyboard application 103 to the mobile devices 115.

For ease of illustration, FIG. 1 shows one block for server system 101, keyboard application 103*b*, and database 199, and shows two blocks for mobile devices 115*a* and 115*n*. Server blocks 101, 103*b*, and 199 may represent multiple systems, server devices, and network databases, and the blocks can be provided in different configurations than shown. For example, server system 101 can represent multiple server systems that can communicate with other server systems via the network 105. In some embodiments, server system 101 can include cloud hosting servers, for example. In some examples, database 199 and/or other storage devices can be provided in server system block(s) that are separate from server system 101 and can communicate with server system 101 and other server systems via network 105.

There may be any number of mobile devices 115. Each mobile device 115 can be any type of electronic device, e.g., portable device, cell phone, smartphone, tablet computer, camera, smart display, wearable devices (e.g., display glasses or goggles, wristwatch, headset, armband, jewelry, etc.), personal digital assistant (PDA), media player, game device, etc. that uses a virtual keyboard. The mobile devices 115 may also include a local database similar to database 199 or other storage. In some embodiments, network environment 100 may not have all of the components shown and/or may have other elements including other types of elements instead of, or in addition to, those described herein.

In various embodiments, users 125 may communicate with server system 101 and/or each other using respective mobile devices 115*a*, 115*n*. In some examples, users 125 may interact with each other via the keyboard application 103 running on respective mobile devices 115 and/or server system 101 via a network service, e.g., a messaging application, a social network service, an image hosting service, or other type of network service, implemented on server system 101. For example, respective mobile devices 115*a*, 115*n* may communicate data to and from one or more server systems, e.g., server system 101.

In some embodiments, the server system 101 may provide appropriate data, such as keyboard application 103 updates, to the mobile devices 115*a*, 115*n* such that each mobile device 115 can receive communicated content or shared content uploaded to the server system 101 and/or network service.

Example Device 200

Figure 2:
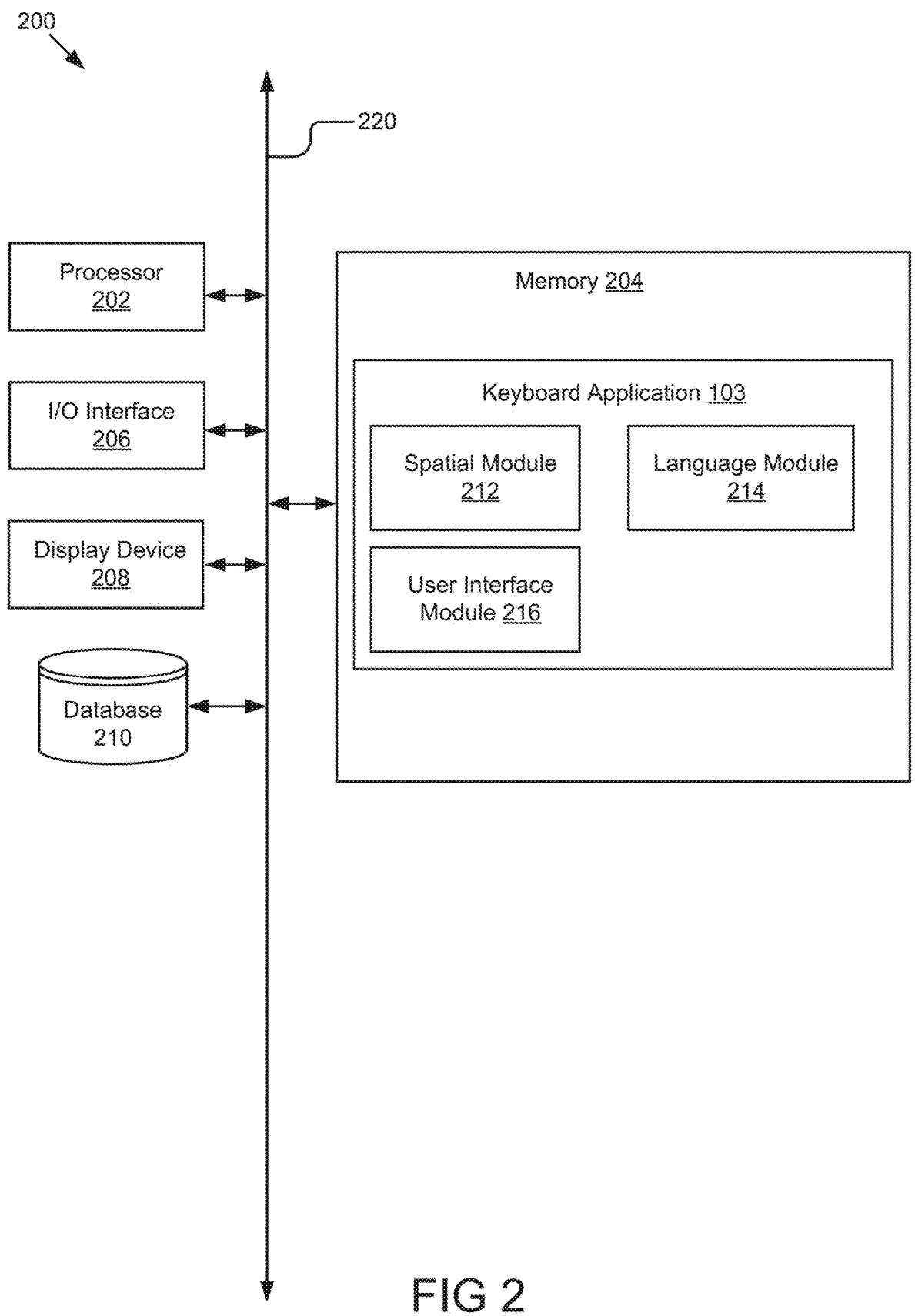
FIG. 2 is a block diagram of an example device, according to some embodiments described herein.

FIG. 2 is a block diagram of an example device 200 which may be used to implement one or more features described herein. In one example, device 200 may be a mobile device 115 used to implement the keyboard application 103. In some embodiments, device 200 may be used to implement the keyboard application 103*a* on the mobile device 115 in part, and the keyboard application 103*b* on the server system 101. Device 200 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, smart display, tablet computer, wearable device (wristwatch, armband, jewelry, headwear, virtual reality goggles or glasses, augmented reality goggles or glasses, head mounted display, etc.), laptop computer, etc.). In the primary example, all computations are performed within the mobile application (and/or other applications) on the mobile computing device. However, it is also possible to use a client/server architecture, e.g., a mobile computing device sends user input data to a server device and receives from the server the final output data for output (e.g., for display). In another example, computations can be split between the mobile computing device and one or more server devices.

In some embodiments, device 200 includes a processor 202, a memory 204, an input/output (I/O) interface 206, a display device 208, and a database 210. Processor 202 can be one or more processors and/or processing circuits to execute program code and control basic operations of the device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 202 may include one or more co-processors that implement neural-network processing. In some embodiments, processor 202 may be a processor that processes data to produce probabilistic output, e.g., the output produced by processor 202 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 204 is typically provided in device 200 for access by the processor 202, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 202 and/or integrated therewith. Memory 204 can store software operating on the device 200 by the processor 202, including a keyboard application 103.

I/O interface 206 can provide functions to enable interfacing the device 200 with other systems and devices. Interfaced devices can be included as part of the device 200 or can be separate and communicate with the device 200. For example, network communication devices, storage devices (e.g., memory and/or database 199), and input/output devices can communicate via I/O interface 206. In some embodiments, the I/O interface can connect to interface devices such as input devices (keyboard, pointing device, touchscreen, microphone, camera, scanner, sensors, etc.) and/or output devices (display devices, speaker devices, printers, motors, etc.). For example, when a user provides touch input, I/O interface 206 transmits the data to the keyboard application 103.

Some examples of interfaced devices that can connect to I/O interface 206 can include one or more display devices 210 that can be used to display content, e.g., images, video, and/or a user interface of an output application as described herein. Display device 210 can be connected to device 200 via local connections (e.g., display bus) and/or via networked connections and can be any suitable display device. Display device 210 can include any suitable display device such as a liquid crystal display (LCD), light emitting diode (LED), or plasma display screen, cathode ray tube (CRT), television, monitor, touchscreen, three-dimensional display screen, or other visual display device. For example, display device 210 can be a flat display screen provided on a mobile device, multiple display screens embedded in a glasses form factor or headset device, or a monitor screen for a computer device.

The database 210 stores data related to the keyboard application 103. For example, the database 210 may store a heatmap of prior touches from a user, a user-specific personal dictionary, etc. In some embodiments, the heatmap is updated to discard prior touches that are older than a predetermined amount of time (e.g., most recent 24 hours, most recent week, most recent hour, etc.).

Example Keyboard Application 103

The keyboard application 103 may include a spatial module 212, a language module 214, and a user interface module 216.

The spatial module 212 applies a dynamic spatial model to map touch input to one or more candidate keys of a virtual keyboard. In some embodiments, the spatial module 212 includes a set of instructions executable by the processor 202 to map the touch input to the one or more candidate keys of the virtual keyboard. In some embodiments, the spatial module 212 is stored in the memory 204 of the device 200 and can be accessible and executable by the processor 202.

In some embodiments, the spatial module 212 receives touch input from a user via the I/O interface 206. The spatial module 212 may generate a heatmap from the touch inputs. In some embodiments, the spatial module 212 generates a heatmap based on a fixed period of time, such as the most recent 24 hours, most recent week, etc. Maintaining a recent heatmap may advantageously account for changes to patterns in a user's touch input, such as for when the user changes a case for the mobile device, develops a hand injury, etc. The spatial module 212 may store the heatmap in the database 210. In some embodiments, where there is insufficient data to generate a heatmap of prior touch inputs by the user, the spatial module 212 may use a default heatmap as a starting point.

In some embodiments, multiple users may use the same mobile device 115. The spatial module 212 may generate multiple heatmaps for the mobile device 115 and retrieve a heatmap for a user based on the heatmap corresponding to a particular user. The spatial module 212 may determine an identity of the user that provides the touch input based on authentication input provided by the user, such as biometric data (e.g., fingerprint, camera identification, etc.), a password, a pass pattern, etc.

In some embodiments, the spatial module 212 maps the touch input to one or more first candidate keys based on a heatmap of prior touch inputs by the user. For example, if the heatmap indicates that the user consistently taps on the center on each of the keys, the spatial module 212 maps the touch input to the center of a candidate key. In another example, if the heatmap indicates that the user consistently taps up and to the left of the keys on the virtual keyboard, the spatial module 212 may map the touch input to correspond to keys that down and to the right of the touch input. The spatial module 212 may retrieve the heatmap for the user based on identifying the user with a fingerprint identification and/or a camera profile. In some embodiments, the spatial module 212 performs adjustments based on the heatmap as described below.

Figure 3A:
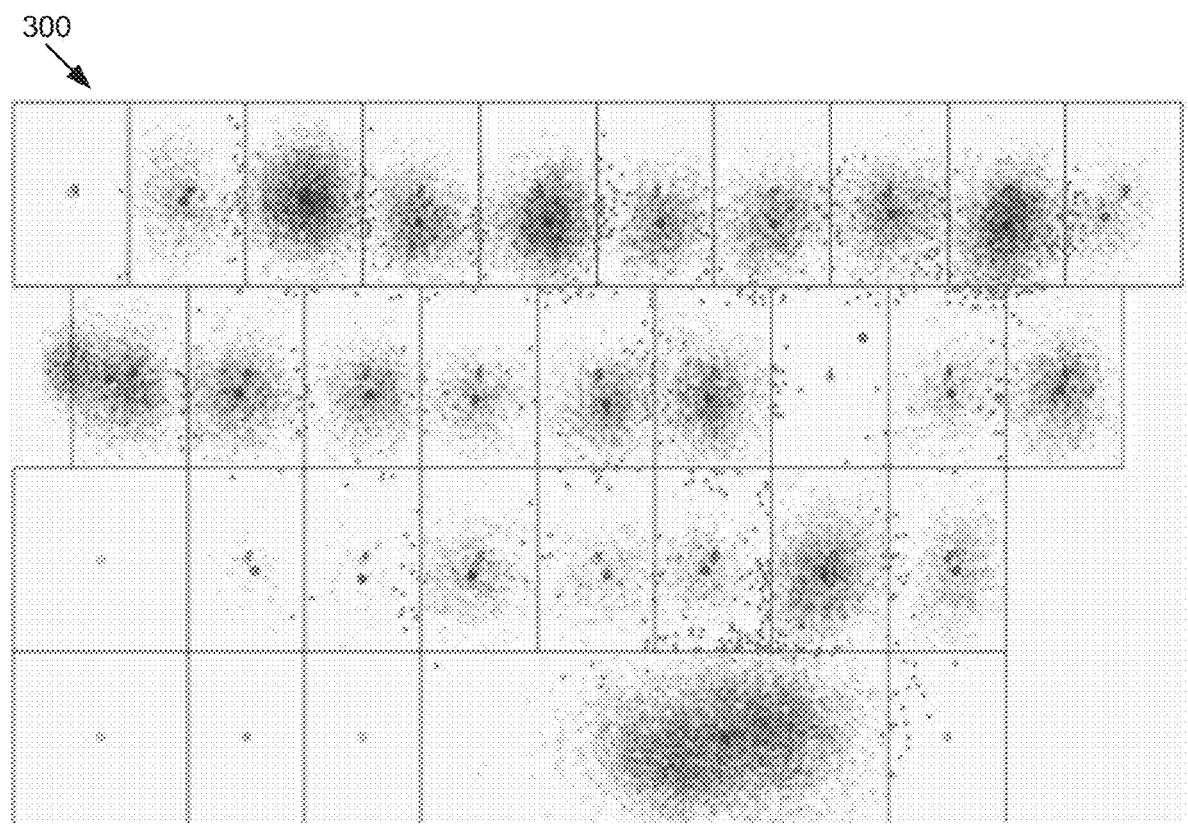
FIG. 3A is an example illustration of a heatmap generated from touch inputs on a virtual keyboard, according to some embodiments described herein.

The spatial module 212 may be used to identify a position of an actual key center for the user and how it differs from a position of a default key center in order to determine a difference between the locations. For example, FIG. 3A is an example illustration 300 of a heatmap generated from prior touch inputs on a virtual keyboard. In this example, the touch input data was collected from 50 users, with 50 sentences for each user. The illustration 300 includes the distribution of all 50 users' touch inputs on 2500 sentences (about 12000 words) on a virtual keyboard. The gray points represent users' actual touch inputs, the red points represent the default key center (i.e., the key center from the keyboard layout), the blue points represent the key center computed from the users' touch inputs, and the green points represent touch inputs that triggered key correction. FIG. 3A demonstrates that users tend to tap lower than the default key center, especially for keys on the first row of the virtual keyboard.

Figure 3B:
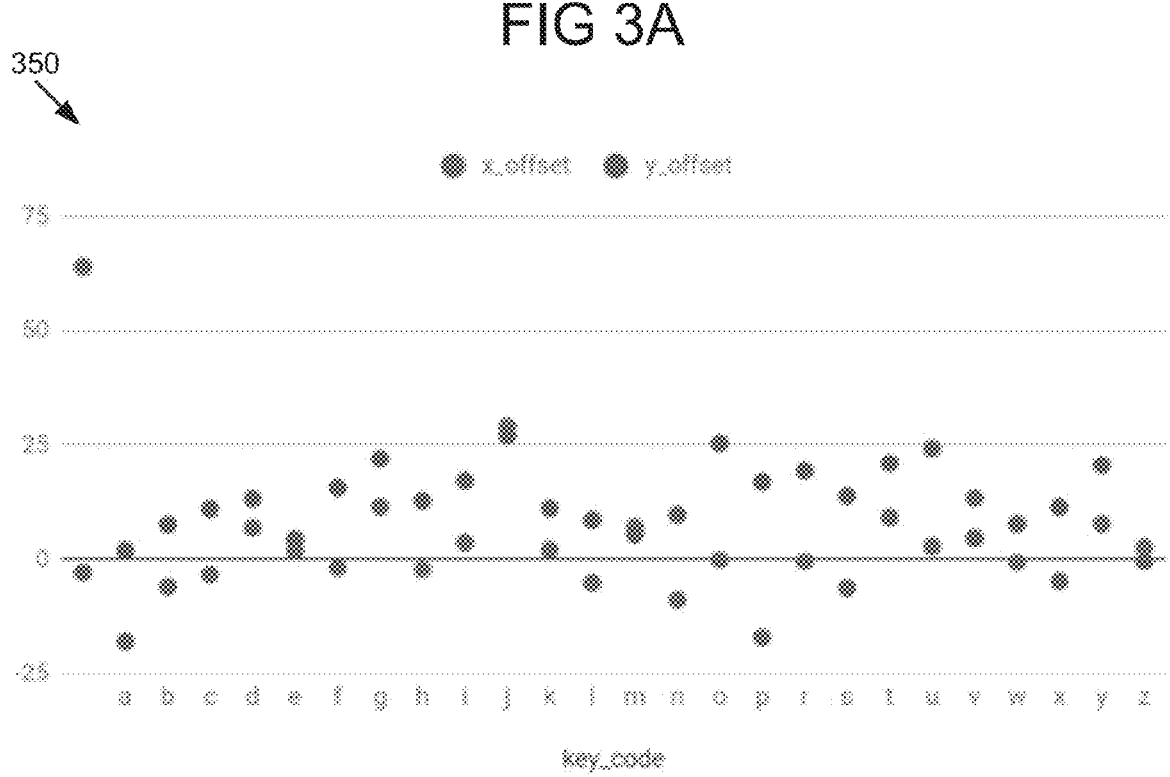
FIG. 3B is an example illustration of a key center offset for each key that is determined based on the heatmap illustrated in FIG. 3A, according to some embodiments described herein.

FIG. 3B is an example illustration 350 of a key center offset that is measured as a distance between the touch input to the geometric key center (in unit pixels) for each key that is determined based on the heatmap illustrated in FIG. 3A according to some embodiments described herein. In this example, the offset for the x-axis (x_offset) is illustrated in blue and the offset for the y-axis (y_offset) is illustrated in red. The most left data point is the offset for the spacebar. Next are the keys for the alphabet. The illustration shows that certain letters have a more dramatic offset than others. For example, the letter "j" has the highest x_offset and y_offset.

In some embodiments, the spatial module 212 generates a dynamic spatial model by determining a key offset between the default key center of the virtual keyboard and an actual key center as indicated by the touch inputs of the user and making dynamic modifications based on the key offset. In some embodiments, the spatial model uses a Gaussian distribution. In some embodiments, the spatial module 212 maintains a different spatial model for different keyboard layouts.

The following definitions will be used in the equations below: x, y are coordinates of the touch input and the unit is pixel; key is a user expected tapped key; $key_{actual}$ the actual key center position of a tapped key from the virtual keyboard; $d(x, y, key_{default})$ is a difference from a user actual touch input to a default key center of key, which is a vector; $d(x, y, key_{actual})$ is a difference from the user actual touch input to the actual key center; $d(key_{actual}, key_{default})$ is a key center offset and is defined as a difference from the user actual key center to the default key center; $\sigma_d$ is a standard of current Gaussian distribution of the spatial model; and $E[d(\ )]$ is the expectation of one specific distance.

In one embodiment, the spatial module 212 determines an align score using the following equation:

$$AlignScore(x, y, \text{key}) = d^2(x, y, key_{default}) / \sigma_d^2 \qquad \text{Eq. 1}$$

The difference from the touch input to the default key center can be treated as a sum of the touch input to the actual key center and actual key center to the default key center as defined by the equation below:

$$d(x, y, key_{default}) = d(x, y, key_{actual}) + d(key_{actual}, key_{default}) \quad \text{Eq. 2}$$

The distribution of touch inputs of one specific key is around the actual key center, which is defined as follows:

$$E[d(x, y, key_{actual})] = 0 \quad \text{Eq. 3}$$

So that:

$$E[d(x, y, key_{default})] = \quad \text{Eq. 4}$$
$$E[d(x, y, key_{actual})] + E[d(key_{actual}, key_{default})] =$$
$$d(key_{actual}, key_{default})$$

To yield the following equation:

$$keyoffset = d(key_{actual}, key_{default}) = E[d(x, y, key_{default})] \quad \text{Eq. 5}$$

The above equation for the key offset reveals that the spatial module 212 predicts the key center offset from the default key center and touch input from users. This is an unsupervised algorithm without complex learning and computations. In some embodiments, the spatial module 212 adds the key center offset to the default key center with a weight to obtain a personalized key center:

$$keycenter_{personalized} = key_{default} + \text{weight} * d(key_{actual}, key_{default}) \quad \text{Eq. 6}$$

The spatial module 212 may determine the key offset for each key (including the spacebar). The key offset may be caused by a user's finger error, such as when a finger is wider than the touching area; a user's position/perspective when typing; and a user's preferring typing habit, such as left, right, one hand, or both hands. In some embodiments, the spatial module 212 maps the touch input to candidate keys of the virtual keyboard based on the key offset. For example, where a touch input seems closer to "e" than "d," the spatial module 212 may determine that the candidate key is "d" based on the actual key center position being higher than the default key center. In some embodiments, the spatial module 212 adjusts a position of at least a portion of the virtual keyboard based on the spatial model. For example, continuing with the previous example, the spatial module 212 may instruct the user interface module 216 to adjust the position of the "d" key or all the letter keys to be higher on the virtual keyboard to reduce the key offset.

Typing errors due to position and visual angle of the virtual keyboard typically remain constant while typing a word. As a result, the spatial module 212 applies word-level learning by using the key center offset as a constant for word prediction because it is unlikely that the key center offset will change between letters. The spatial module 212 determines the key offset for a first part of a word and then predicts a second part of the world. For example, if the user is typing "internationalization," and already types "internation," when computing the spatial score for the letter "a," the spatial module 212 determines the key center offset based on the touch inputs of "internation," applies the key center offset to the key center of the spatial model; and computes the personalized spatial score.

In some embodiments, the spatial module 212 uses the following factors in the spatial model: a key center sample size that specifies a minimum number of touch inputs to be learned, a tap key center offset weight that is the weight of the key center offset that is applied to the key center for tap typing, and a gesture key center offset weight that is the weight of the key center offset applied to the key center for gesture typing.

In some embodiments, instead of performing word-level learning, the spatial module 212 performs in-memory learning. This addresses defects in world-level learning where the length of the word is too short and instances where noise influences the personalized key center enough to cause inaccuracy. The spatial module 212 performs in-memory learning by keeping the user history in a cache stored in the database 210. More specifically, when the user starts typing a word the spatial module 212 retrieves a key center offset from the in-memory history, applies the key center offset to the key center, calculates the spatial score, and updates the in-memory history. In some embodiments, the spatial module 212 uses the following factors in the spatial model: a key center sample size that specifies a minimum number of touch inputs to be learned and a tap key center offset weight that is the weight of the key center offset that is applied to the key center for tap typing.

In some embodiments, the spatial module 212 performs a key correction for a spacebar of the virtual keyboard by changing how touch inputs are interpreted for the spacebar. For example, even when a user provides a touch input that is not directly on the spacebar, the spatial module 212 may interpret it as corresponding to a touch of the spacebar. The spatial module 212 may use a Gaussian distribution to determine how to perform the key correction.

In some embodiments, the spatial module 212 determines the distribution of touch inputs using a Gaussian distribution around the key center of the spatial model. For example, the spatial module 212 may use a Gaussian model param function with the following parameters: an offset at an x-axis, an offset at a y-axis, a variance at the x-axis, a variance at the y-axis (where, if this is missed the variance at the x-axis is used), covariance of the distributions in two dimensions where the default is to treat the distributions as independent distributions, and a total amount of data points. Based on the definition of the of the Gaussian parameters, the spatial module 212 maintains the following different levels of personalized parameters: a global level correction based on a global key center offset where all the keys in the keyboard layout share one parameter, a cluster level correction of a cluster key center offset where all the keys in a same cluster share one parameter, and a key level correction of a key level center offset where each key has its own Gaussian parameters.

In some embodiments, the spatial module 212 generates a separate spatial model for the key correction in addition to the spatial model used for a global key center offset. This way, the spatial module 212 accounts for predictions that occur before a space is input and after a space is input. For example, the spatial module 212 uses a first spatial module to make a word prediction before the end of a word, e.g., "mornin" has a key prediction of "g" and even if the user types "h" the spatial module 212 selects the letter "g." The spatial module 212 uses a second spatial module to make a word prediction once the entire word has been written, e.g., the spatial module 212 turns the written word "jappy" into "happy."

Figure 4:
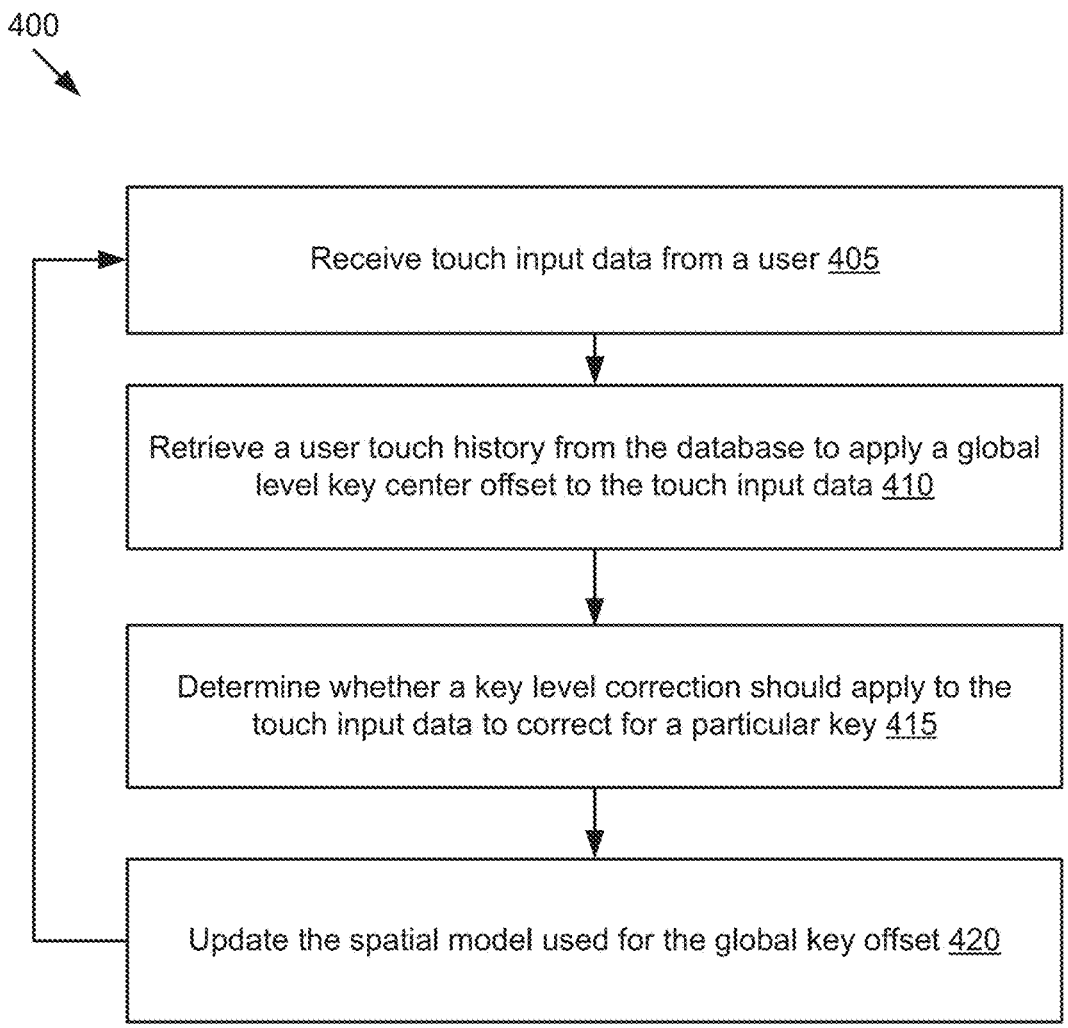
FIG. 4 is an example flowchart for applying key correction to each key in a virtual keyboard according to some embodiments described herein.

FIG. 4 is an example flowchart 400 for applying key correction to each key in a virtual keyboard according to some embodiments described herein. In this example the spatial module 212 receives 405 touch input data from a user, retrieves 410 a user touch history from the database 210 to apply a global level key center offset to the touch input data, determines 415 whether a key level correction (KC) should apply to the touch input data to correct for a particular key, and updates 420 the spatial model used for a global key center offset.

For this embodiment, the spatial module 212 does not apply the key level correction when certain preconditions are met. For example, the spatial module 212 will not apply the key level correction if the sample size falls below a predetermined threshold, the spatial module 212 applies a learning weight of key center offset to the touch input, or the spatial module 212 applies a learning weight of key center variance to the touch input. In some embodiments, although the spacebar is a key, the spatial module 212 applies different rules to the spacebar because it has a larger x range, such as not updating the spatial model used for the global key offset.

Figure 5A:
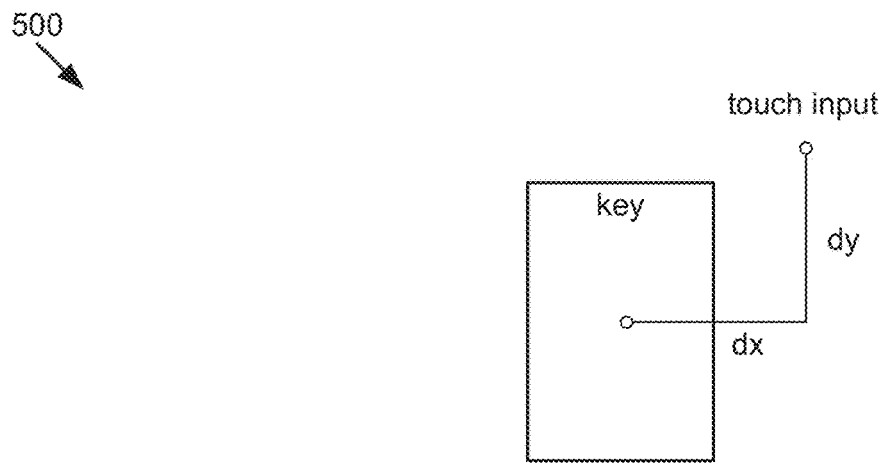
FIG. 5A is an example illustration of a difference in x-dimension and a difference in y-dimension between a center of a key on the virtual keyboard and touch input from a user.
Figure 5B:
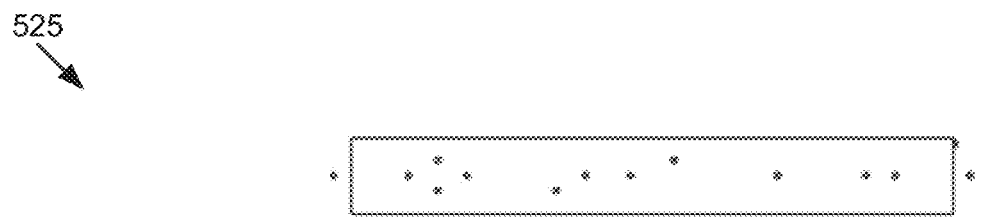
FIG. 5B is an example illustration of touch inputs for a spacebar on a virtual keyboard.

In some embodiments, the spatial module 212 uses a Gaussian distribution as part of the key level correction to generate a spatial score. FIG. 5A is an illustration 500 of how the spatial module 212 determines a difference in x-dimension (dx) and a difference in y-dimension (dy) between a center of a key on the virtual keyboard and touch inputs from a user according to some embodiments. For keys where the width or height of the key (e.g., the spacebar) is larger than common keys (e.g., "n"), users may not touch in the center of the key. For example, FIG. 5B is an illustration 525 of touch inputs for a spacebar, which shows that in addition to not touching in the center of the spacebar, some users even touch outside of the spacebar.

In some embodiments, the spatial module 212 determines the bound of the keys using the following equations:

$$x\_lower\_bound = center\_x - key\_width/2 + common\_key\_width/2 \quad \text{Eq. 7}$$

$$x\_upper\_bound = center\_x + key\_width/2 - common\_key\_width/2 \quad \text{Eq. 8}$$

$$y\_lower\_bound = center\_y - key\_height/2 + common\_key\_height/2 \quad \text{Eq. 9}$$

$$y\_upper\_bound = \quad \text{Eq.10}$$

$$center\_y + key\_height/2 - common\_key\_height/2$$

Figure 5C:
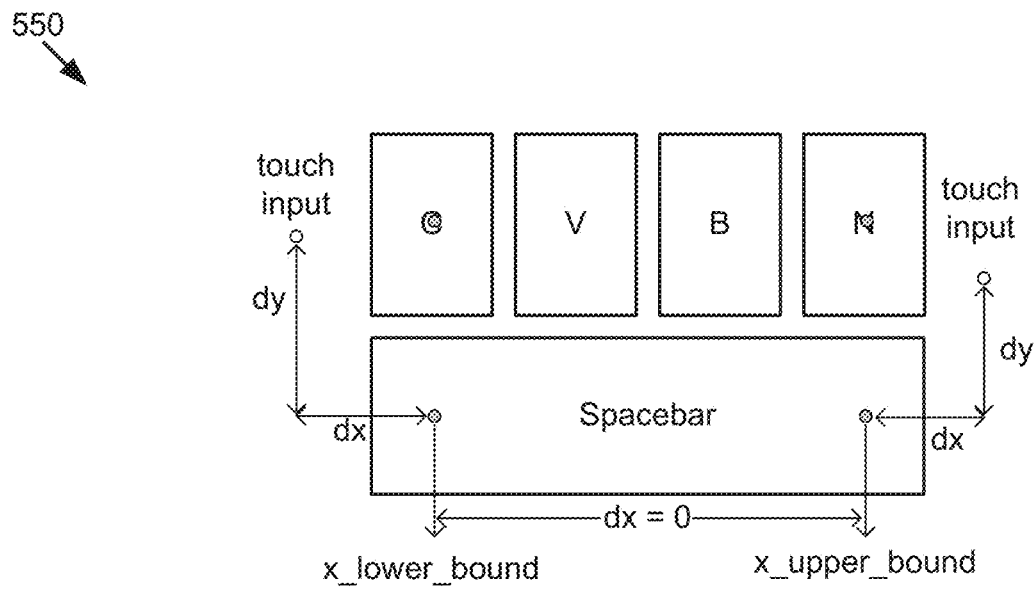
FIG. 5C is an example illustration of calculation of a change in x-dimension and a change in y-dimension for touch inputs with reference to the spacebar, according to some embodiments described herein.

FIG. 5C is an example illustration 550 of how to calculate a change in x-dimension (dx) and a change in y-dimension (dy) for touch inputs with reference to the spacebar. FIG. 5C illustrates the default key centers for the C key, the N key, and the spacebar as gray circles. FIG. 5C illustrates the touch inputs as open circles. As illustrated in FIG. 5C, the x_lower_bound of the spacebar is the same value as the center x of key "C" and the x_upper_bound of the spacebar is the same value as the center x of key "N."

For keys whose width is larger than common keys (e.g., for the spacebar), the spatial module 212 determines dx using the following equations:

If touch_x > x_lower_bound & touch_x < x_upper_bound, then $dx = 0$     Eq. 11

If touch_x < x_lower_boun, then $dx = x\_lower\_bound - touch\_x$     Eq. 12

If touch_x > x_upper_bound, then $dx = touch\_x - x\_upper\_bound$     Eq. 13

For keys whose height is larger than common keys, the spatial module 212 determines dy using equations similar to equations 11-13, but with y substituted for x.

Figure 5D:
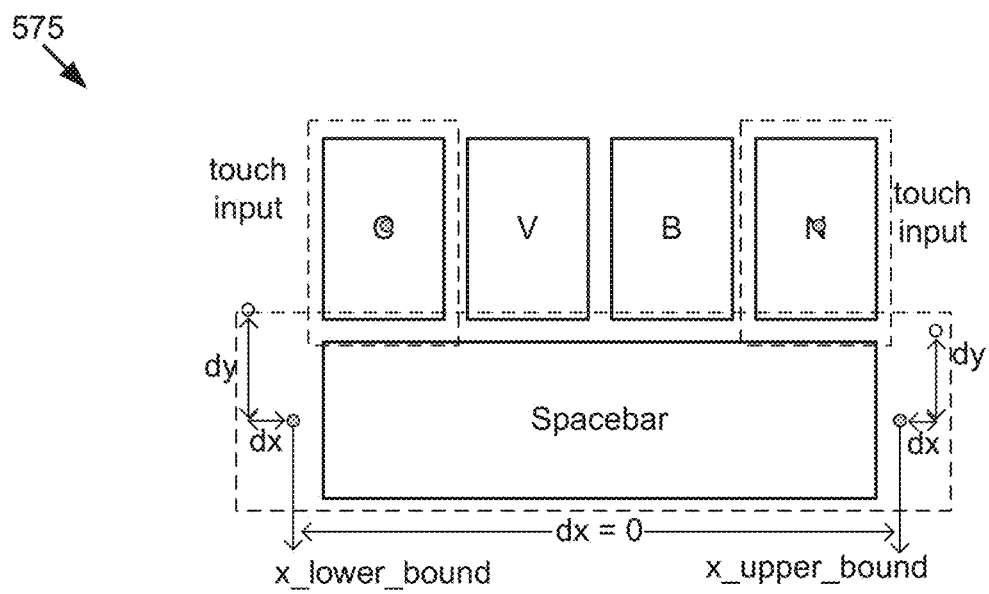
FIG. 5D is an illustration of how to make a Gaussian distribution used by the spatial model include more overlap of keys on the virtual keyboard according to some embodiments described herein.

In some embodiments, the spatial module 212 uses an expanded version of the Gaussian distribution as part of the key level correction to generate a spatial score. FIG. 5D is an illustration 575 of how to make a Gaussian distribution used by the spatial model have more overlap between the C and N keys and the spacebar on the virtual keyboard. In this example, the spatial module 212 uses a gaussian_target_size_factor with a value of 1.5 as illustrated by the dashed lines in FIG. 5D. The spatial module 212 multiples the width and height of all keys by the gaussian_target_size_factor and also multiplies the common key width and common key height by the gaussian_target_size_factor. As a result, touch inputs that are between the "C" key and the spacebar or the "N" key and the spacebar may map the touch input to candidate keys "C" and spacebar or "N" and the spacebar instead of with a less expansive Gaussian distribution that would have less overlap and so the spatial module 212 would map the touch input to either candidate keys "C" or the spacebar or candidate keys "N" or the spacebar.

Continuing with FIG. 5D, the spatial module 212 obtains the error x_lower_bound and x_upper_bound for the spacebar by multiplying the width and height of all keys by the gaussian_target_size_factor. Because the x_lower_bound of the spacebar is smaller than the center x of key C and the x_upper_bound of the spacebar is larger than the center x of key N, the dx results in the spatial module 212 associating a larger spatial score to the spacebar than from using a Gaussian distribution without the gaussian_target_size_factor.

In some embodiments, the spatial module 212 performs a key correction for keys of the virtual keyboard by adjusting the visual appearance of at least the portion of the virtual keyboard. In some examples, the spatial module 212 moves a position of the entire virtual keyboard to reduce the key offsets. In another example, the spatial module 212 modifies a visual appearance of particular keys based on the heatmap. For example, the spatial module 212 may determine based on the heatmap that the key offset for the key "N" is the greatest of all the letter keys and, as a result, increases a size of the boundaries of the key "N" on the virtual keyboard.

In some embodiments, the spatial module 212 adjusts the visual appearance for the spacebar. For example, in some embodiments where the spatial module 212 determines, based on a heatmap, that touch input is supposed to correspond to the space bar, but the touch input is outside the spacebar, the spatial module 212 instructs the user interface module 216 to generate graphical data that adjusts the visual appearance of the spacebar based on a heatmap of the touch inputs. The spatial module 212 may instruct the user interface module 216 to modify the display by raising the keyboard position (e.g., by about half a space bar height), extending the clickable area of the spacebar until it reaches the system navigation bar, extending the space bar clickable area below the spacebar (e.g., by about half a space bar height), or raising the keyboard position to an optimal height as determined based on a history of touch inputs from the user. In some embodiments, the spatial module 212 may instruct the user interface module 216 to generate graphical data that adjusts the visual appearance of the spacebar by changing the boundaries of the spacebar.

Figure 6A:
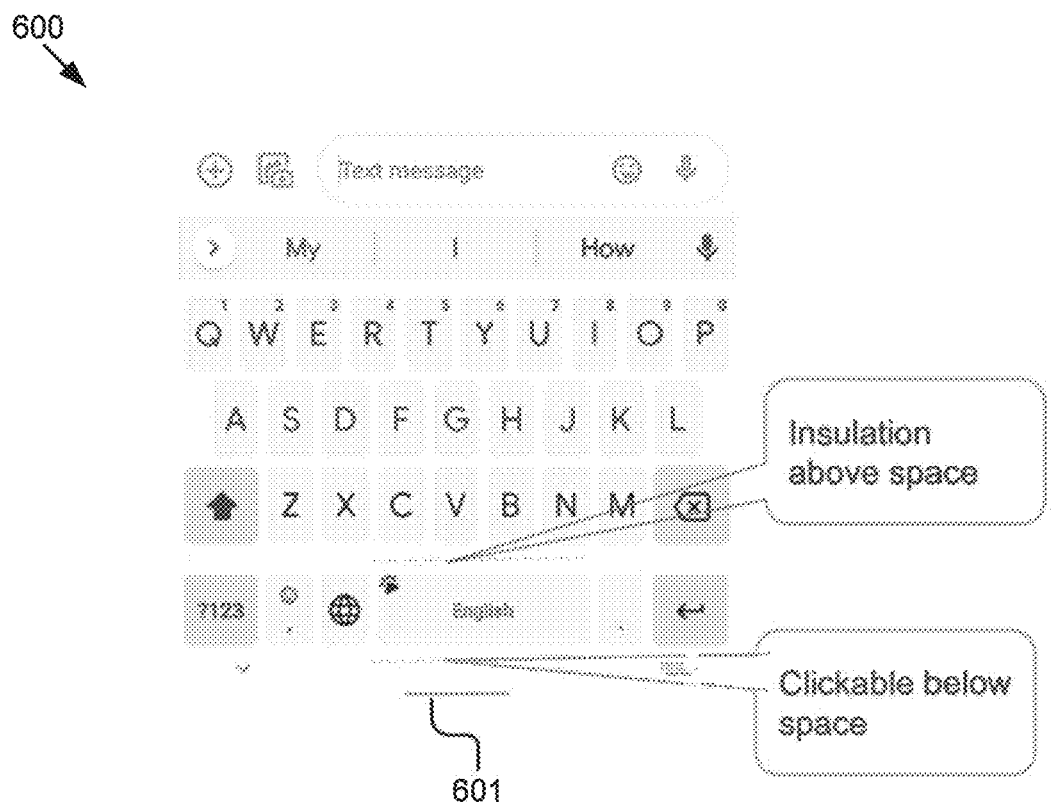
FIG. 6A is an example illustration of two different ways to modify a position of the spacebar according to some embodiments described herein.

FIG. 6A is an example illustration 600 of two different ways to modify a position of the spacebar according to some embodiments described herein. In this example, touch inputs that are received in the insulation above the space and the clickable space from below the spacebar until the system navigation bar 601 are still considered to correspond to selection of the spacebar. In some embodiments, the spatial module 212 modifies a visual appearance of the spacebar or modifies a mapping of the touch input with more pixels to correspond to the spacebar.

Figure 6B:
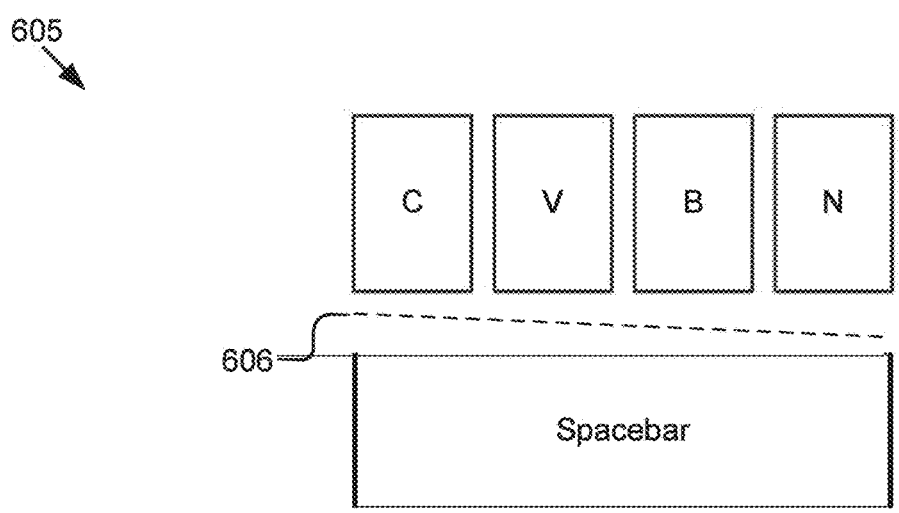
FIG. 6B is an example illustration of a virtual keyboard where the heatmap indicates that touch inputs from the user for the spacebar are at an angle.

FIG. 6B is an example illustration 605 of a virtual keyboard where the heatmap indicates that touch inputs from the user for the spacebar are at an angle. In this example, the heatmap is represented by the dashed angled line 606. This could occur, for example, where a user types primarily with their right hand and the thumb provides touch inputs at a higher angle than the other fingers. In some embodiments, the spatial module 212 uses a heat map that includes touch inputs at a higher angle to detect touch inputs in an overlapping region and uses the spatial model to interpret whether the touch input is meant for C, V, B, or N keys or a spacebar. As a result, although the visual appearance of the spacebar remains the same, the spatial module 212 maps the touch input with more pixels to correspond to the spacebar at an angle such that more pixels that are closer to the C, V, B, or N keys or even overlap with those keys are assigned to the spacebar.

Figure 6C:
FIG. 6C is an example illustration of a virtual keyboard with visual separation between letters and the function keys, according to some embodiments described herein.

FIG. 6C is an example illustration 625 of a virtual keyboard with visual separation between letters and the function keys according to some embodiments described herein. In this example, the function keys are inside the red rectangles. The letters are displayed in white and the other keys are displayed with visual separation. For example, the caps lock, the number/character function key, the comma key, the period key, and the backspace are displayed in gray, the enter button is displayed in blue, and the search button and spacebar are displayed in white but as part of a row of keys in other colors.

Figure 6D:
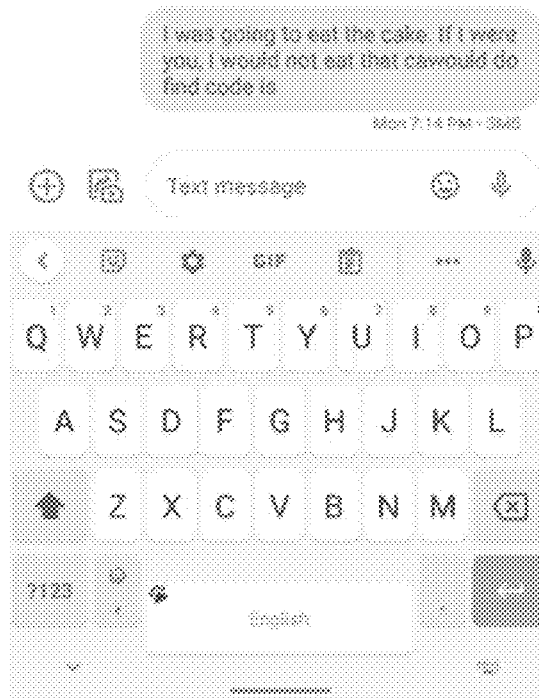
FIG. 6D is an example illustration of a virtual keyboard with the spacebar key shifted downward and offset from neighboring keys, according to some embodiments described herein.

FIG. 6D is an example illustration 630 of a virtual keyboard where the user interface module 216 modified a visual appearance of the spacebar by shifting the spacebar lower to solve for confusion between the spacebar and the C, V, B, and N keys according to some embodiments described herein.

Figure 6E:
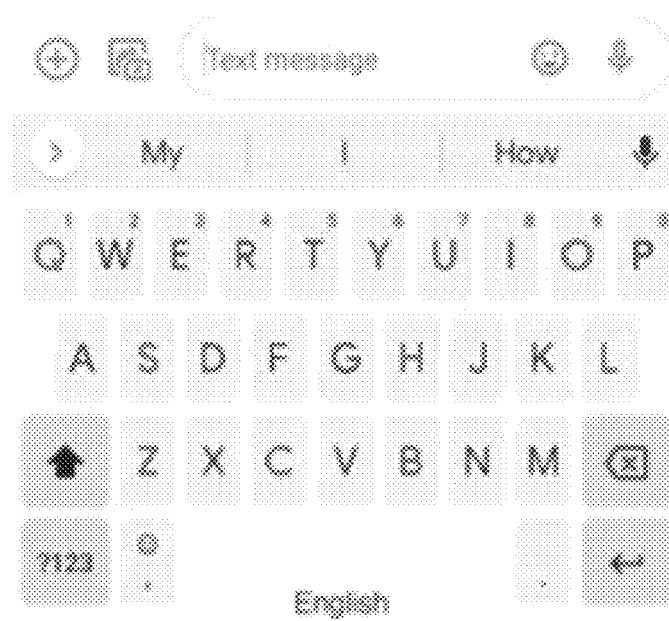
FIG. 6E is an example illustration of a virtual keyboard with a blank space in the place of a spacebar key, according to some embodiments described herein.

FIG. 6E is an example illustration 650 of a space-less design that reduces confusion between the spacebar and the C, V, B, or N keys according to some embodiments described herein. In this example, the user interface module 216 generated a virtual keyboard with a spacebar that has no visual outline. Furthermore, the spatial module 212 determines that touch inputs that are not directly on the C, V, B, or N keys correspond to the spacebar. As a result, a greater number of touch inputs are mapped to the spacebar unless they are directly on one of the C, V, B, or N keys.

Figure 6F:
FIG. 6F is an example illustration of using insulation above and below the spacebar key, according to some embodiments described herein.

FIG. 6F is an example illustration 670 of using insulation above and below the spacebar to solve for confusion between the spacebar and the C, V, B, or N keys according to some embodiments described herein. In this example, the user interface module 216 generated a virtual keyboard with a spacebar that both has no visual outline and there is insulation above and below the spacebar so that an even greater number of touch inputs that are not directly on C, V, B, or N keys correspond to the spacebar.

The language module 214 applies a language model to map touch input to one or more candidate keys of a virtual keyboard. In some embodiments, the language module 214 includes a set of instructions executable by the processor 202 to map the touch input to one or more candidate keys of the virtual keyboard. In some embodiments, the language module 216 is stored in the memory 204 of the device 200 and can be accessible and executable by the processor 202.

In some embodiments, the language module 214 maps the touch input to one or more second candidate keys of the virtual keyboard that may be different from the one or more first candidate keys that the spatial module 212 mapped the touch input to. For example, the spatial module 212 may determine based on the spatial model that, where the first three letters are "rat" that the fourth letter is "s" based on the proximity of the touch input to the letter "s," but the language module 214 maps the touch input to the letter "e" because the language model indicates that "rate" is a more common word than "rats" or the user types "rate" more frequently than "rats." In some embodiments, the language module 214 may be different for different languages.

The language module 214 may map the touch input to the one or more second candidate keys based on comparing the position of the touch input to one or more predicted next keys. In some embodiments, the language module 214 applies a Gaussian distribution to predict the next letter. For example, the Gaussian distribution is big for the letter "n" because it is so common. The language module 214 dynamically adjusts for each character.

The language module 214 may select a particular key from the one or more first candidate keys determined by the spatial module 212 (e.g., "s") and the one or more second candidate keys determined by the language module 214 (e.g., "e") as indicated by the touch input. The one or more first candidate keys may be the same as the one or more second candidate keys or they may be different. In some embodiments, if there is a conflict between the one or more first candidate keys and the one or more second candidate keys, the language module 214 may select a particular key based on the candidate keys that are most likely to form a word.

In some embodiments, the language module 214 may perform a post correction of one or more words based on replacing characters with a space or a space with a character using the language model. For example, where two words were "mor" and "ing," the language module 214 may perform post correction to insert the letter "n" and create the single word "morning" from the two words.

The user interface module 216 generates graphical data for displaying a user interface. In some embodiments, the user interface module 216 includes a set of instructions executable by the processor 202 to generate the graphical data for displaying the user interface. In some embodiments, the user interface module 216 is stored in the memory 204 of the device 200 and can be accessible and executable by the processor 202.

In some embodiments, the user interface module 216 generates graphical data for displaying a user interface, such as a virtual keyboard that is part of an application, such as a messaging application. The user interface module 216 may receive instructions from the language module 214 to display a particular key as indicated by the touch input from the user.

Example Flowchart 700

Figure 7:
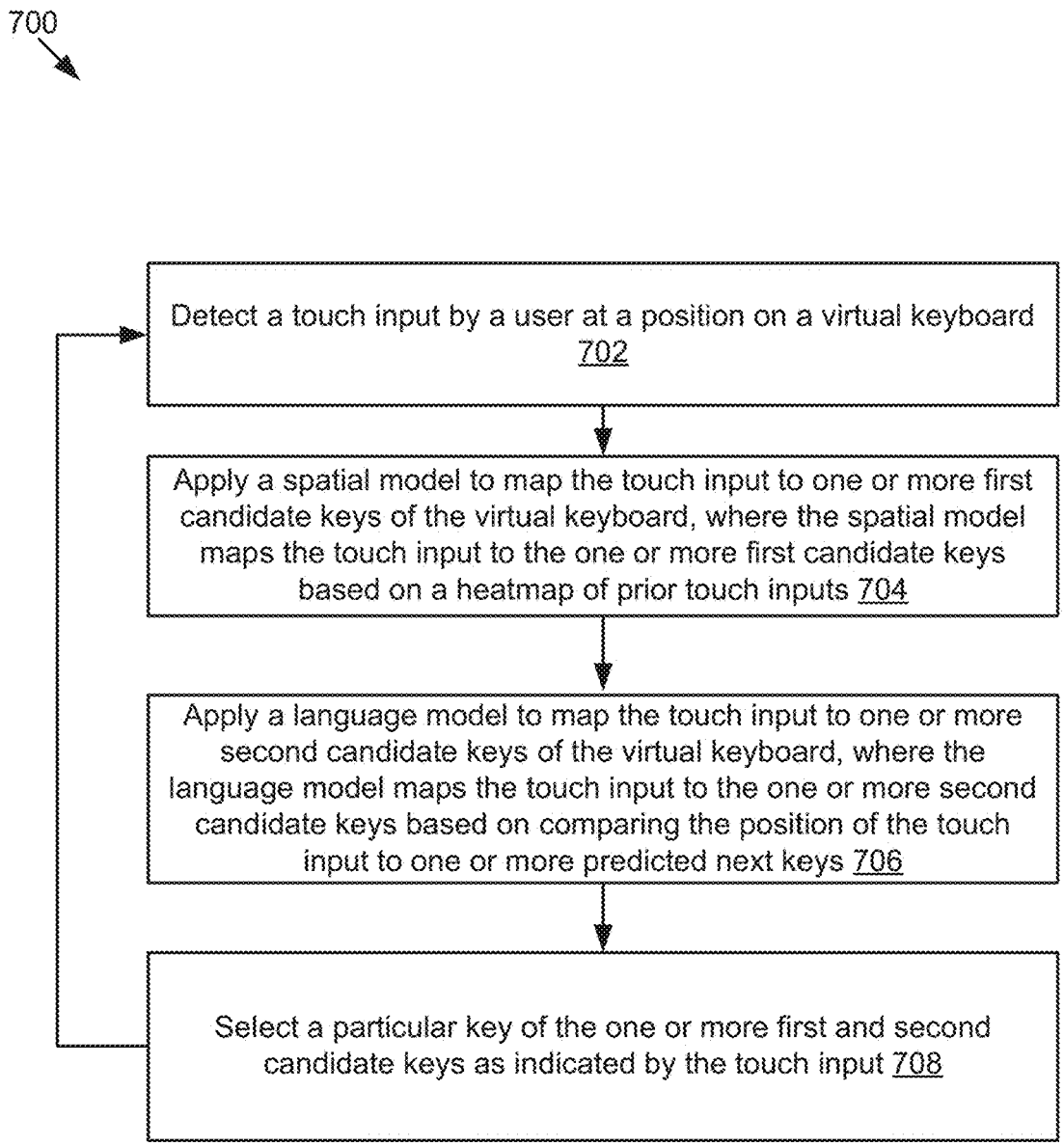
FIG. 7 is a flowchart of an example method to select a particular key based on a touch input received on a virtual keyboard, according to some embodiments described herein.

FIG. 7 is an example flowchart 700 for selecting a particular key for a virtual keyboard according to some embodiments described herein. The flowchart 700 may be performed by the device 200 in FIG. 2, such as the mobile device 115 illustrated in FIG. 1.

The method 700 may begin at block 702. In block 702, a touch input is detected by a user at a position on a virtual keyboard. Block 702 may be followed by block 704.

At block 704, a spatial model is applied to map the touch input to one or more first candidate keys of the virtual keyboard. The spatial model maps the touch input to the one or more first candidate keys based on a heatmap of prior touch inputs. Block 704 may be followed by block 706.

At block 706, a language model is applied to map the touch input to one or more second candidate keys of the virtual keyboard. The language model maps the touch input to the one or more second candidate keys based on comparing the position of the touch input to one or more predicted next keys. Block 706 may be followed by 708, At block 708, a particular key of the one or more first and second candidate keys is selected as indicated by the touch input.

While method 700 has been described with reference to various blocks in FIG. 7, it may be understood that techniques described in this disclosure may be performed without performing some of the blocks of FIG. 7. In some embodiments, one or more of the blocks illustrated in FIG. 7 may be combined.

Although the description has been described with respect to particular embodiments thereof, these particular embodiments are merely illustrative, and not restrictive. Concepts illustrated in the examples may be applied to other examples and embodiments.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained such as to a city, ZIP code, or state level), so that a particular location of a user cannot be determined. Thus, the user may have control over what information is collected about the user, how that information is used, and what information is provided to the user.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a client device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular embodiments. Different programming techniques may be employed, e.g., procedural or object-oriented. The routines may execute on a single processing device or multiple processors. Although the steps, operations, or computations may be presented in a specific order, the order may be changed in different particular embodiments. In some embodiments, multiple steps or operations shown as sequential in this specification may be performed at the same time.

The invention claimed is:

1. A computer-implemented method comprising:
    detecting a touch input by a user at a position on a virtual keyboard;
    applying a first spatial model to map the touch input to one or more first candidate keys of the virtual keyboard by:
    applying a first distribution based on a heatmap of prior touch inputs near a key center to determine a global key center offset;
    mapping the touch input to the one or more first candidate keys based on the global key center offset;
    applying a language model to map the touch input to one or more second candidate keys of the virtual keyboard, wherein the language model maps the touch input to the one or more second candidate keys based on comparing the position of the touch input to one or more predicted next keys; and
    selecting a particular key of the one or more first and second candidate keys as indicated by the touch input.

2. The method of claim 1, further comprising:
    applying a second spatial model for a key correction that includes a key center offset.

3. The method of claim 2, further comprising:
    adjusting a visual appearance of the virtual keyboard based on the global key center offset and the key center offset, wherein the global key center offset applies to letter keys and the key center offset applies to a subset of the letter keys.

4. The method of claim 3, wherein adjusting the visual appearance of the virtual keyboard based on the key center offset includes increasing a size of the subset of the letter keys with a greatest key offset.

5. The method of claim 1, wherein applying the first spatial model includes generating a spatial score that indicates a confidence in the one or more first candidate keys, applying the language model includes generating a language score that indicates a confidence in the one or more second candidate keys, and the particular key is selected based on a combination of the spatial score and the language score exceeding a threshold value.

6. The method of claim 1, wherein the first spatial model is based on an orientation of a user device that displays the virtual keyboard.

7. The method of claim 1, where the first spatial model is used to interpret the touch input without changing a visual appearance.

8. A computing device comprising:
a processor; and
a memory coupled to the processor, with instructions stored thereon that, when executed by the processor, cause the processor to perform operations comprising:
detecting a touch input by a user at a position on a virtual keyboard;
applying a first spatial model to map the touch input to one or more first candidate keys of the virtual keyboard by:
applying a first distribution based on a heatmap of prior touch inputs near a key center to determine a global key center offset;
mapping the touch input to the one or more first candidate keys based on the global key center offset;
applying a language model to map the touch input to one or more second candidate keys of the virtual keyboard, wherein the language model maps the touch input to the one or more second candidate keys based on comparing the position of the touch input to one or more predicted next keys; and
selecting a particular key of the one or more first and second candidate keys as indicated by the touch input.

9. The computing device of claim 8, wherein the operations further comprise:
applying a second spatial model for a key correction that includes a key center offset.

10. The computing device of claim 9, wherein the operations further comprise:
adjusting a visual appearance of the virtual keyboard based on the global key center offset and the key center offset, wherein the global key center offset applies to letter keys and the key center offset applies to a subset of the letter keys.

11. The computing device of claim 10, wherein adjusting the visual appearance of the virtual keyboard based on the key center offset includes increasing a size of the subset of the letter keys with a greatest key offset.

12. The computing device of claim 8, wherein applying the first spatial model includes generating a spatial score that indicates a confidence in the one or more first candidate keys, applying the language model includes generating a language score that indicates a confidence in the one or more second candidate keys, and the particular key is selected based on a combination of the spatial score and the language score exceeding a threshold value.

13. The computing device of claim 8, wherein the first spatial model is based on an orientation of a user device that displays the virtual keyboard.

14. The computing device of claim 8, where the first spatial model is used to interpret the touch input without changing a visual appearance.

15. A non-transitory computer-readable medium with instructions stored thereon that, when executed by one or more computers, cause the one or more computers to perform operations, the operations comprising:
detecting a touch input by a user at a position on a virtual keyboard;
applying a first spatial model to map the touch input to one or more first candidate keys of the virtual keyboard by:
applying a first distribution based on a heatmap of prior touch inputs near a key center to determine a global key center offset;
mapping the touch input to the one or more first candidate keys based on the global key center offset;
applying a language model to map the touch input to one or more second candidate keys of the virtual keyboard, wherein the language model maps the touch input to the one or more second candidate keys based on comparing the position of the touch input to one or more predicted next keys; and
selecting a particular key of the one or more first and second candidate keys as indicated by the touch input.

16. The non-transitory computer-readable medium of claim 15, wherein the operations further comprise:
applying a second spatial model for a key correction that includes a key center offset.

17. The non-transitory computer-readable medium of claim 16, wherein the operations further comprise:
adjusting a visual appearance of the virtual keyboard based on the global key center offset and the key center offset, wherein the global key center offset applies to letter keys and the key center offset applies to a subset of the letter keys.

18. The non-transitory computer-readable medium of claim 17, wherein adjusting the visual appearance of the virtual keyboard based on the key center offset includes increasing a size of the subset of the letter keys with a greatest key offset.

19. The non-transitory computer-readable medium of claim 15, wherein applying the first spatial model includes generating a spatial score that indicates a confidence in the one or more first candidate keys, applying the language model includes generating a language score that indicates a confidence in the one or more second candidate keys, and the particular key is selected based on a combination of the spatial score and the language score exceeding a threshold value.

20. The non-transitory computer-readable medium of claim 15, wherein the first spatial model is based on an orientation of a user device that displays the virtual keyboard.

* * * * *